Aug. 3, 1965 D. SIGEL 3,198,993
COINCIDENCE GATE GENERATOR
Filed Aug. 3, 1962 2 Sheets-Sheet 1
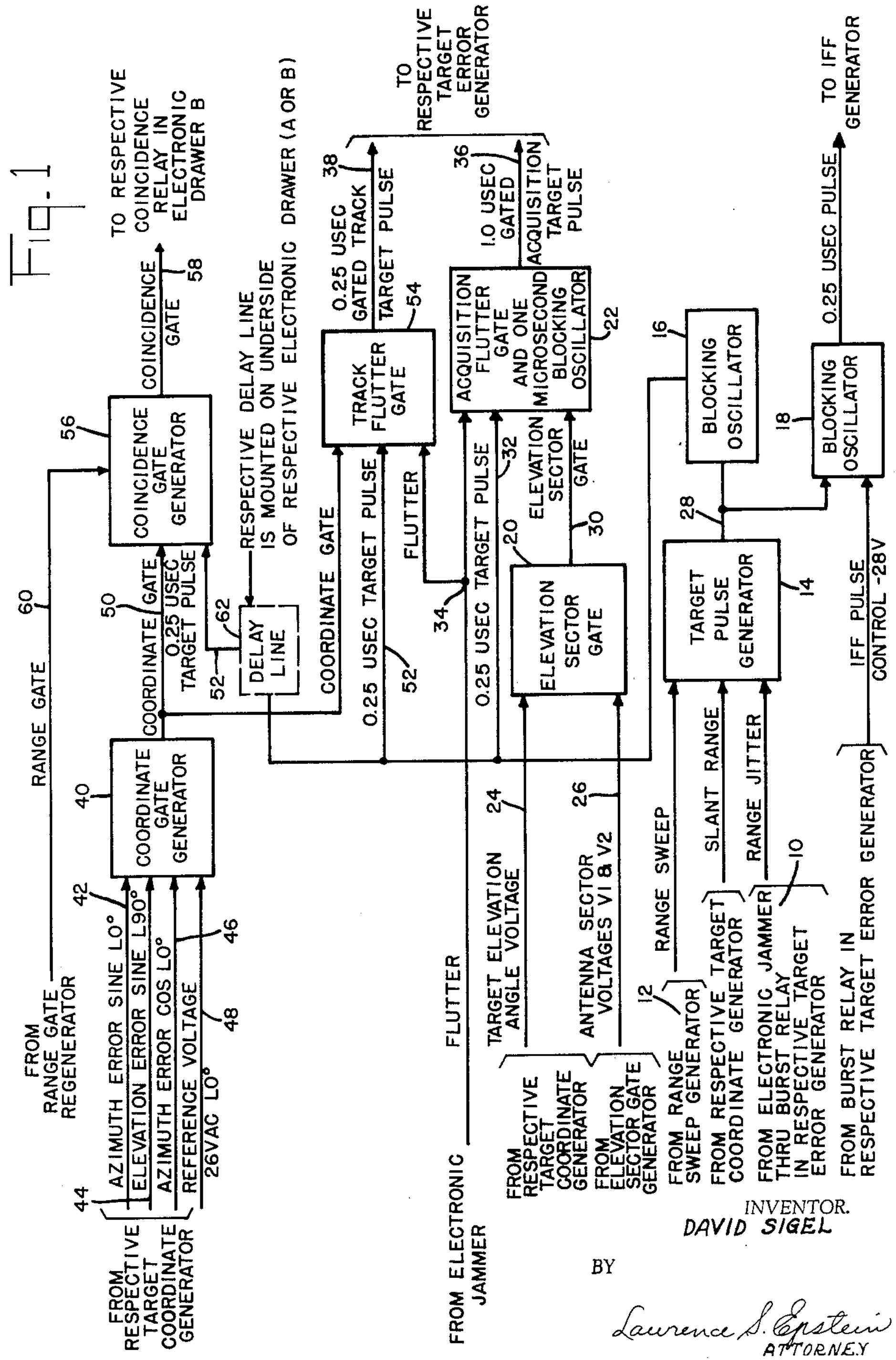
INVENTOR.
DAVID SIGEL
BY
Laurence S. Epstein
ATTORNEY COINCIDENCE GATE GENERATOR
Filed Aug. 3, 1962 2 Sheets-Sheet 2
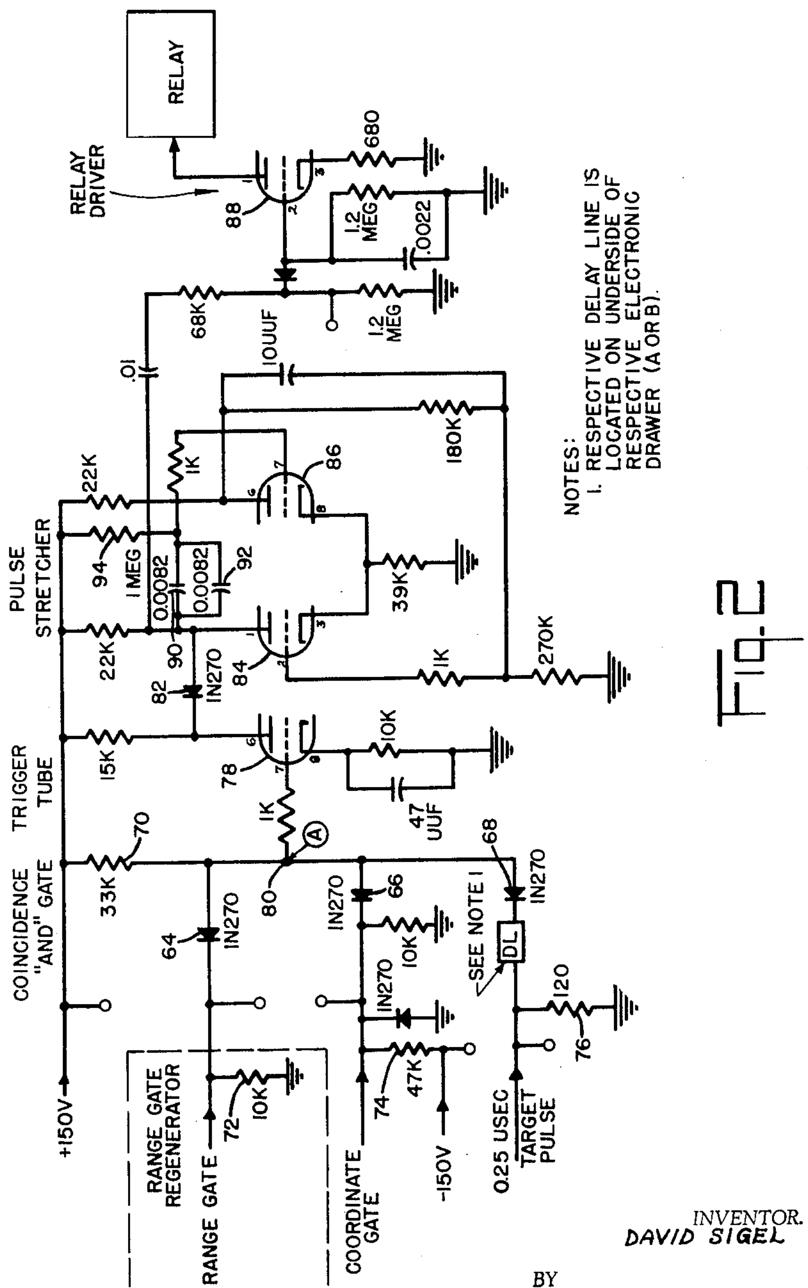
INVENTOR.
DAVID SIGEL
BY
Laurence S. Epstein
ATTORNEY 3,198,993

COINCIDENCE GATE GENERATOR

David Sigel, Verona, N.J., assignor, by mesne assignments, to the United States of America as represented by the Secretary of the Navy Filed Aug. 3, 1962, Ser. No. 214,775
1 Claim. (Cl. 317—149)

This invention refers to a radar circuit and has particular reference to a coincidence gate circuit for radar simulators. Coincidence gate circuits are well known and have been used for many years in connection with training and simulation purposes. Most of the radar trainers simulate a similarity of targets which move in longitude and latitude. The instant invention is directed towards the generation of a coincidence gate circuit when the simulated operational trainer is properly tracking a designated simulated aircraft target in range, azimuth and elevation.

In the prior art the circuitry utilized for producing range, azimuth and elevation information for each target being simulated has been electro-mechanical, servo-mechanism means. These electro-mechanical-servo mechanism means provide outputs which represent the range, azimuth and elevation of the simulated target, of the simulated missile and of the antenna scan. The angle of target elevation and the angle of antenna scan are then compared in a comparison circuit or a coincidence circuit which causes a signal to be produced whenever the angle of antenna elevation and of target elevation are in coincidence. This requirement for electro-mechanical, servo-mechanism means necessitates a duplication for each individual target and requires a plurality of resolvers and servo-mechanisms.

The coincidence circuits required to compare the coincidence of target antenna angles are of necessity bulky in that the signal outputs from electro-mechanical resolvers and servo-mechanisms must be transformed into simple electrical signals which can be easily compared.

It is an object of this invention to provide a simple and novel coincidence circuit which utilizes simple electronic circuitry.

A further object of this invention is to provide a novel coincidence circuit which will operate for large variations in magnitude of input signals and will compare a multiplicity of signals and provide an output only when all input signals coincide.

Another object of this invention is to provide a novel coincidence circuit which is adaptable for use on different types of comparison systems for comparing target and antenna scan angles.

Other objects and many of the attendant advantages of this invention will be readily appreciated as the same becomes better understood by reference to the following detailed description when considered in connection with the accompanying drawings wherein:

FIG. 1 is a block schematic diagram of the target range pulse generator which has as one of its elements the coincidence gate generator of the instant invention; and FIG. 2 is a simplified schematic diagram of the coincidence gate generator of the instant invention.

Referring now to FIG. 1, in the preferred embodiments of the instant invention, the target range pulse generators comprise six target and one missile range pulse generator. These pulse generators form gated acquisition and track air target or missile pulses. Each target or missile pulse occurs at a time determined by slant range developed in a respective target coordinate generator or in the missile coordinate generator and at a time relative to the operational radar synchronizing pulse. Target or missile pulses generated in respective target range pulse generators are temporarily blanked or reduced in amplitude at random by flutter voltages from the electronic jammer. This results in scintillation of targets and simulates a condition which normally occurs when target and missile video is viewed on a radar oscilloscope. Target and missile video is also modified in respective target range pulse generators by jitter voltages to simulate the effect of coincidence between a target and a missile. An output pulse from each of the six target range pulse generators, in the preferred embodiment, associated with the generation of aircraft target video, is used to initiate an identification friend or foe response.

The coincidence circuits of a respective target range pulse generator produce an indication on a respective target coordinate generator panel of the trainee's console when an operational radar is properly tracking a designated simulated aircraft target in range, azimuth and elevation. The effects of coincidence of a target and a missile are introduced into the simulation of target and missile video when the coincidence circuit of a designated target and that of a missile operate simultaneously and a burst enable signal is fed to the device from the ground guidance computer of the Nike radar set. The description which follows refers to a preferred embodiment of a single air target range pulse generator of the simulator.

FIG. 1 is a block diagram of the overall target range generator used to generate target pulses. A target pulse generator generates an output pulse at times determined by slant range voltage from a respective external target coordinate generator and a range sweep voltage from the range sweep generator. The respective target coordinator 10 and the range sweep generator 12 output pulses from the target pulse generator 14 drives two blocking oscillator stages 16 and 18. The 0.25 microsecond pulses generated by the action of the blocking oscillator 16 enter into the formation of a coincidence gate, gated acquisition target pulses and gated track target pulses within the target range generator. The 0.25 microsecond pulses generated by the blocking oscillator 18 are fed to an external IFF generator to initiate a simulated IFF response. The range jitter signal and IFF pulse control voltage inputs shown in FIG. 1 are coupled to the target pulse generator only when coincidence between a simulated target and a simulated missile occurs.

In the acquisition phase of a gun-fired control problem, one-microsecond gated target pulses are generated. This is accomplished by the elevation sector gate 20, the acquisition flutter gate and a one-microsecond blocking oscillator 22. The elevation sector gate 20 receives a target elevation angle voltage 24 from a respective target coordinate generator and antenna sector voltages 26 and 28 from the elevation sector generator. The output from the elevation sector gate occurs if the elevation angle is within the elevation sector defined by the elevation sector voltages 26 and 28.

This output 30 causes the generation of a gated one-microsecond acquisition target pulse from the blocking oscillator 22 if a 0.25 microsecond target pulse 32 from the target pulse generator is applied to the acquisition flutter gate and provided that a flutter voltage 34 is simultaneously applied from the electronic jammer. The gated one-microsecond acquisition target pulse 36 is fed to an antenna pattern modulator.

Gated track target pulses 38 generated in respective target pulse generator are fed to a respective target error generator during the track phase of a gun fire control problem. The track phase occurs when the operational track radar antenna is within 1.4 degrees vector sum in azimuth and elevation of the simulated target. This condition is determined by the coordinate gate generator 40 which has as inputs from a respective target coordinate generator, track azimuth error sine 0 degrees phase 42, track elevation error sine 90 degrees phase 44 and tack azimuth error cosine zero degrees phase 46.

A 26 volt 400 cycle A.C. zero degrees phase reference voltage 48 from the device power supply is also fed to the coordinate gate generator. The coordinate gate generator forms a positive going coordinate gate 50 when input voltages define target coordinates that are within a 1.4 degree vector sum error in elevation and azimuth between the simulated target coordinates and the position of the operational radar tracking antenna. The coordinate gate 50, the 0.25 microsecond target pulse 52 and flutter voltage, if arriving simultaneously, enable the track flutter gate. The resultant gated 0.25 microsecond pulse from the track flutter gate 54 is fed to the circuits of a respective target error generator. A coincidence gate generator 56 forms a coincidence gate 58 when a radar range gate from the device range gate regenerator 60, a 0.25 microsecond target pulse from target pulse generator 52 is fed through a delay line 62 external to the target range pulse generator module and a coordinate gate 50 are applied simultaneously to this circuit. The coincidence gate operates a respective relay that energizes a lamp which signifies that the target is being tracked in range elevation and azimuth. The coincidence gate generator is described in detail below.

The 0.25 microsecond target pulse 52 is fed through respective delay line 62 to insure that the target pulse is coincident with the radar range and coordinate gates. During the quiescent state, diodes 64, 66 and 68 are conducting since each diode is connected between the positive 150 volt line and ground through a respective resistor 70 and respectively resistors 72, 74 and 76.

Consequently, the voltage at the grid of tube 78 is at a minimum until the three inputs to the coincidence AND gate are applied simultaneously. The positive going coincidence step voltage resulting from the three simultaneous positive inputs raises the potential at point 80 so that conduction through tube 78 is increased. The resultant negative going pulse at the plate of tube 78 is coupled through diode 82 to trigger pulse stretcher tube 84.

A monostable cathode coupled multivibrator comprising tubes 84 and 86 is used to stretch the coincidence gate. The negative going coincidence gate from the plate of trigger tube 78 is used to cut off tube 86 which is normally conducting in the quiescent state. The usual multivibrator action causes tube 84 to begin conduction with a resultant fall in plate potential that cuts off relay driver tube 88. The period that tube 86 is cut off depends upon the time that capacitors 90 and 92 charged through resistor 94. The relatively long time constant of capacitors 90 and 92 and resistor 94 in the grid circuit of tube 86 causes the stretching of a narrow incoming coincidence gate. Negative D.C. rectifying of the A.C. waveform generated by the pulse stretcher, is accomplished by providing diode 96, which is coupled to an RC storage means, which includes resistor 98 and capacitor 99. The storage means provide negative D.C. bias storage for sustaining the switching duration of the relay driven by the relay driver.

In operation, the coincidence generator which consists of a coincidence AND gate comprising three input crystal rectifiers 64, 66 and 68, th pulse stretcher comprising tubes 84 and 86 and the relay driver tube 88, generates a positive coincidence gate when a coordinate gate, a 0.25 microsecond target pulse and a radar range gate are applied simultaneously to the circuit. This coincidence gate pulse is amplified and inverted by trigger tube 78. The resultant negative pulse is used to trigger the pulse stretcher which increases the time that a negative coincidence signal is applied to the grid of the relay driver 88. The coincidence gate is of short duration which must be stretched in order to prevent chattering of relays in order to provide positive coincidence gate action.

Obviously many modifications and variations of the present invention are possible in the light of the above teachings. It is therefore to be understood that within the scope of the appended claim the invention may be practiced otherwise than as specifically claimed.

What is claimed is:

An electrical control circuit comprising:

means for mixing a multiplicity of input signals;

trigger generation means, coupled to said mixing means, for providing a trigger signal upon the simultaneous occurrence of input signals;

pulse stretching means, coupled to the output of said trigger generation means, for stretching the trigger signal generated thereby;

relay means which are normally in the energized unswitched state; and relay driver means, having its input coupled to said pulse stretcher means, and its output coupled to said relay means, for switching said relay means by de-energizing said relay, thereby providing faster switching, said relay driver including, an electronic valve means, having a control electrode, a storage means, coupled to said electron valve means' control electrode, for providing long duration bias pulsing to sustain the relay during the de-energized switching time, and rectifying means, coupled to the output of said stretching means, and to said storage means, for rectifying the output pulse generated by the stretching means.

References Cited by the Examiner

UNITED STATES PATENTS

| | | | |
|---|---|---|---|
| 2,787,707 | 4/57 | Cockburn | 250—27 |
| 3,066,278 | 11/62 | Padberg et al. | 340—3 |
| 3,109,125 | 10/63 | Wachowiak | 317—148.5 |

SAMUEL BERNSTEIN, *Primary Examiner.*

MAX L. LEVY, *Examiner.*